United States Patent [19]

Siccardi

[11] Patent Number: 4,922,810
[45] Date of Patent: May 8, 1990

[54] AUTOMATIC DEVICE FOR OBTAINING FROTHY MILK

[76] Inventor: Alberto Siccardi, Via B. Panizza, 8 - 20144 - Milan, Italy

[21] Appl. No.: 306,705

[22] Filed: Feb. 6, 1989

[30] Foreign Application Priority Data

Feb. 4, 1988 [IT] Italy ................................ 19308 A/88

[51] Int. Cl.⁵ .................... A47J 31/40; A47J 31/46; A47J 43/12; B01F 3/00
[52] U.S. Cl. .................... 99/323.1; 99/275; 99/293; 99/452; 99/453; 261/DIG. 7; 261/DIG. 16; 366/101
[58] Field of Search ................ 99/323.1, 323.2, 323.3, 99/452, 453, 454, 483, 275, 293; 366/101, 176, 139; 222/1, 145; 239/113, 425.5, 427.3, 427.5, 428.5; 426/474, 511, 519, 409; 261/DIG. 7, DIG. 16, 121 R, 121.1, DIG. 76

[56] References Cited

U.S. PATENT DOCUMENTS

| | | | |
|---|---|---|---|
| 2,126,625 | 8/1938 | Eggleston | 99/454 X |
| 4,620,953 | 11/1986 | Silla et al. | 261/DIG. 16 |
| 4,715,274 | 12/1987 | Paoletti | 99/452 X |
| 4,735,133 | 4/1988 | Paoletti | 99/454 |
| 4,816,190 | 3/1989 | Kirchler | 426/474 X |

FOREIGN PATENT DOCUMENTS

| | | |
|---|---|---|
| 195750 | 9/1986 | European Pat. Off. . |
| 243326 | 10/1987 | European Pat. Off. . |
| 540839 | 12/1931 | Fed. Rep. of Germany . |
| 1278999 | 10/1968 | Fed. Rep. of Germany . |

Primary Examiner—Timothy F. Simone
Attorney, Agent, or Firm—Young & Thompson

[57] ABSTRACT

An automatic device for obtaining frothy milk comprises a first mixing assembly (30) which feeds a second frothing assembly (40), comprising an expansion chamber (17), a milk feeding duct (31) being provided in the first assembly (30) inside a nozzle (13) for the pressurized steam, this nozzle being coaxial to the milk duct (31), the outlet of this duct slightly projecting over the steam outlet. The milk-steam mixture which is formed, tangentially flows to the expansion chamber, which has a circular section. Preferably the diameter of the nozzle (12) of the outflowing milk is about 1.1–1.2 mm, while the clear radial span of the annular section nozzle (13) of the outflowing steam is about 0.2 mm, the milk outlet projecting about 0.2 mm with respect to the steam outlet.

8 Claims, 3 Drawing Sheets

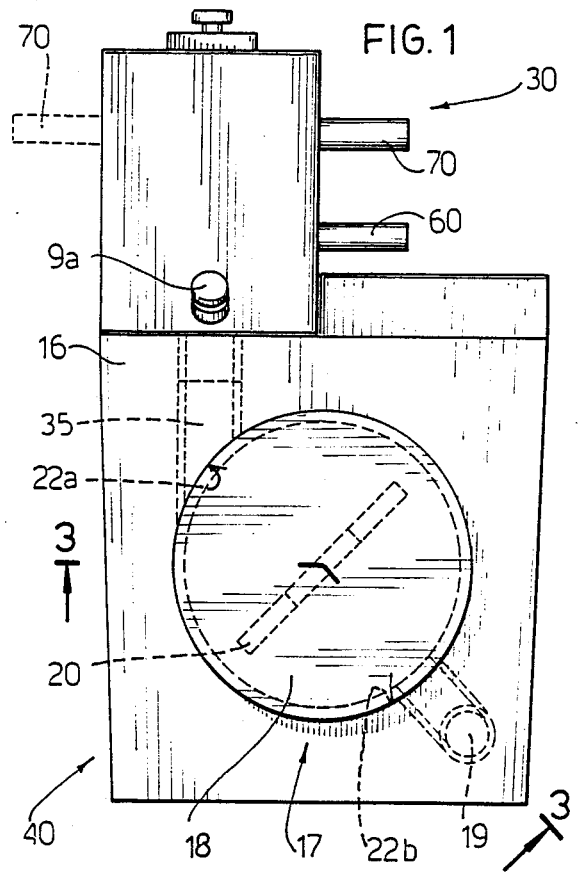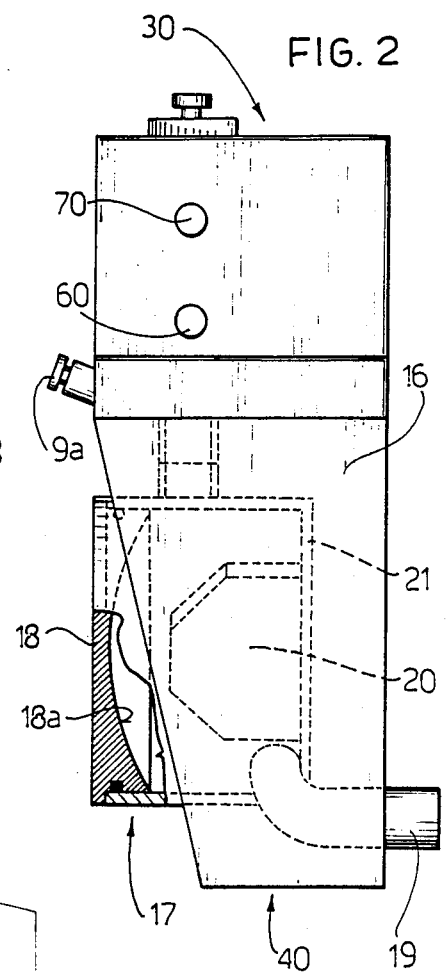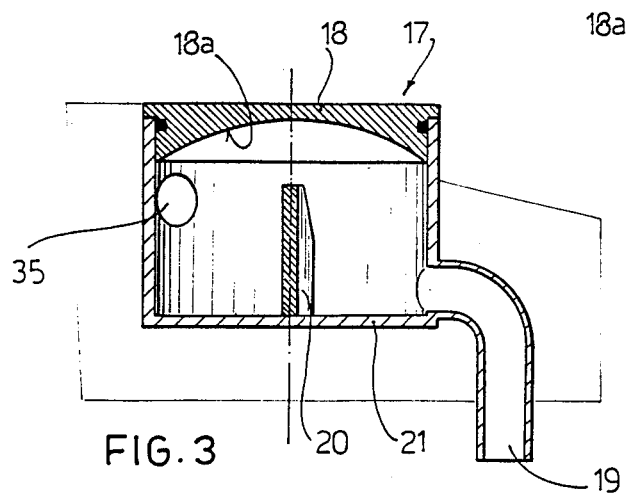

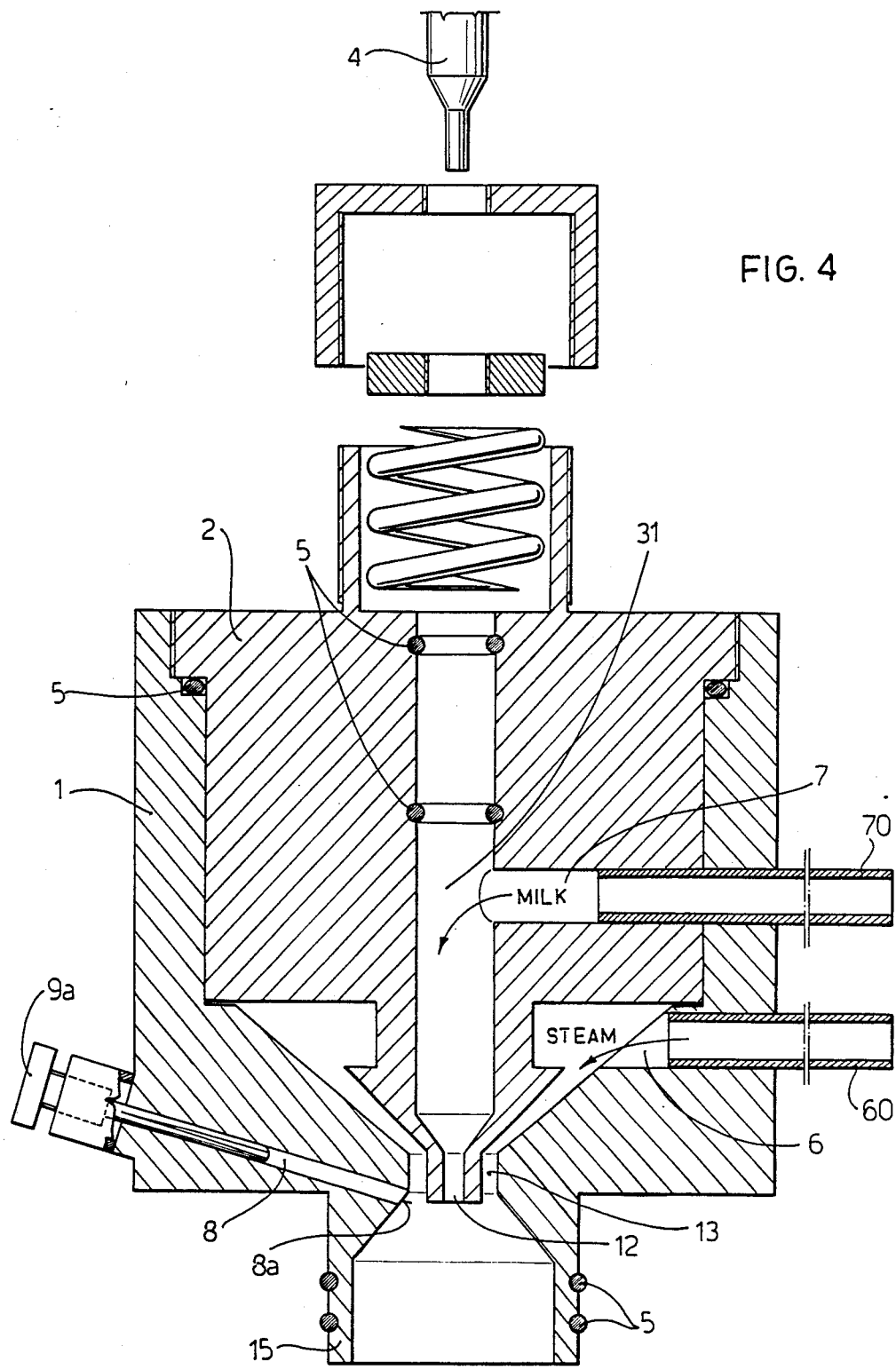

AUTOMATIC DEVICE FOR OBTAINING FROTHY MILK

The invention concerns a device for obtaining frothy milk which is usually used for preparing Italian cappuccino.

At present the frothy milk is obtained by inserting a spout in a jug of cold milk, steam coming out of said spout. The operation of making froth by means of such a device give good results only if the operator who holds the jug slightly moves the same for a predetermined time. The desired consistency of the froth therefore depends, to a large extent, on the operator.

The aim of the invention is to provide an automatic device which allows anyone to obtain frothy milk without any skill.

The above aim has been achieved with a device comprising a first mixing assembly capable of feeding a second frothing assembly consisting of an expansion chamber, a milk feeding duct being provided in the first assembly inside a nozzle for the pressurized steam this nozzle being coaxial to the milk duct, the outlet of this milk feeding duct slightly projecting over the steam outlet, the milk-steam mixture tangentially incoming into a circular section expansion chamber.

Preferably the diameter of the nozzle of the outflowing milk is about 1.1-1.2 mm, while the clear radial span of the annular section nozzle for the outflowing steam is about 0.2 mm, the milk outlet projecting about 0.2 mm with respect to the steam outlet.

The milk can be fed by free fall, by arranging the feeding duct in a vertical position, or by suction using the vacuum created by the steam expanding around the milk nozzle.

Preferably the mixing assembly is completed by an auxiliary lateral air duct, the outlet of which is provided immediately downstream of the throttle created by the steam nozzle. The auxiliary duct can be provided in this case with a device which controls the air flow.

The auxiliary duct is provided in order to incorporate in the milk-steam mixture a percentage of air which can modify the consistency, that is the density, of the froth.

Preferably the adjusting device of the auxiliary duct is carried out by means of a pin, engaged with said auxiliary duct, which tapers towards the end turned towards the outlet, the degree of insertion of the pin in the duct determining the quantity of air pulled out by the effect of vacuum caused by the exit and expansion of the milk-steam mixture. The adjusting pin acts at the same time as a means of cleaning the duct.

The milk duct, as well, can be provided with a cleaning pin; in such a case a milk inlet can be provided, perpendicular to the duct.

The second assembly preferably comprises, in the cylindrical expansion chamber an obstacle which diverts the flow. The upper part of the chamber can be made of a cover having a concave inner surface which facilitates the rotation of the milk-steam mixture and the outlet of the milk froth.

One embodiment of the invention is illustrated in the attached drawings, in which:

FIG. 1 shows a top view of the device;

FIG. 2 shows a partial section view, from the right with respect to FIG. 1;

FIG. 3 shows a section along line 3—3 of FIG. 1;

FIG. 4 shows a horizontal section of the mixing assembly, in which the steam and milk inlet fittings have been rotated by 90° so that they can be seen;

Figure 5:
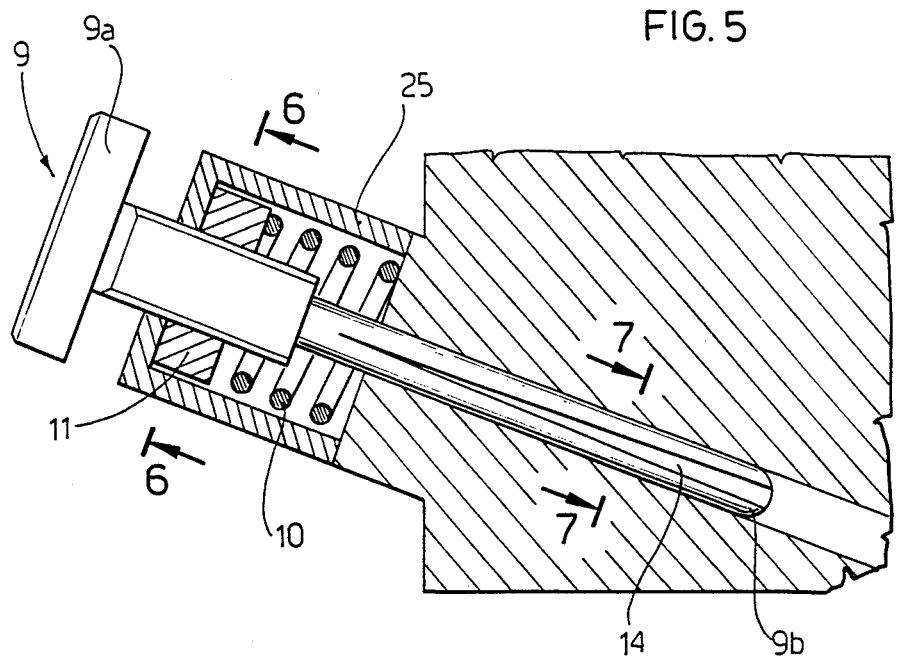
FIG. 5 shows a longitudinal section view of the adjusting device of the auxiliary air duct.

In FIGS. 1, 2 and 3 a device comprising a first assembly 30 adjacent to a second assembly 40 is shown. The two assemblies 30 and 40 are connected to each other by a duct 35 without throttle. The duct 35 tangenzially opens in an area 22a of a lateral wall of a cylindrical chamber 17, comprising a bottom part 21, provided with a baffle 20 capable of diverting the flow, and a cover part 18 having a concave inner surface 18a. The chamber 17 is joined, in a lower part 22b of the lateral wall substantially diametrically opposite the area 22a, with an outlet duct 19, which moves away from the housing 16 of the second assembly 40.

The first assembly 30, illustrated in detail in FIG. 4, comprises an outer body 1 and an inner body 2 joined detachably to each other, for example by threading. In the inner body 2 a substantially cylindrical duct 31 can be seen, provided with a nozzle 12 (the diameter of which is about 1.2 mm). A cyliindrical duct 7, jointed with a fitting 70 and perpendicular to the duct 31, communicates with the duct 31. Possibly a further duct (shown in dashed lines in FIG. 1) can be provided, perpendicular to the duct 31 and communicating with it, placed diametrically opposite the duct 7. The lower end part of the duct 31 is surrounded by an annular nozzle 13 (the clear radial outletting span of which is about 0.2 mm). A duct 6, jointed to a fitting 60 and perpendicular to the axis of the nozzle 13, communicates with this nozzle 13. The nozzle 13 and the duct 31 are coaxial. The nozzle 12 of the duct 31 slightly projects (about 0.2 mm) with respect to the nozzle 13. Sideways to the nozzle 13 an auxiliary duct 8 is provided, the outlet 8a of which is immediately downstream of the throttle created by the nozzle 13. The duct 31, the nozzle 13 and the duct 8 let out in a fitting 15 jointed with the connecting duct 35 of the two assemblies 30 and 40. The duct 31, the fitting 15 and the inner body 2 are provided with O-rings 5.

Figure 6:
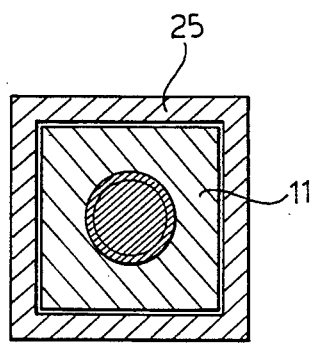
FIG. 6 shows a section along line 6—6 of FIG. 5.
Figure 7:
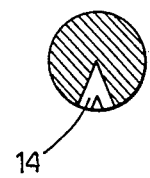
FIG. 7 shows a section along line 7—7 of FIG. 5.

The end of the auxiliary duct 8 which faces outside is provided with an adjusting device shown in detail in FIGS. 5, 6 and 7. Such device comprises a pin 9, which is received in the auxiliary duct 8, the head 9a of which is engaged, by threading, with a square washer 11 housed sliding in a seat 25 and subject to the returning of a helicoidal compression spring 10. The pin 9 has a longitudinal groove 14 the section of which increases proceeding towards the end 9b opposite the head 9a; the section of the pin 9 is consequently uniformly reduced from the head 9a towards the end 9b.

A pin device 4 similar to the one previously described, but without groove 14, affects the duct 31, as shown in an exploded view in the upper part of FIG. 4.

The device described above is a device capable of obtaining frothy milk, particularly useful in the preparation of Italian cappuccino.

When using the device, the milk coming from the duct 7 enters the duct 31 and reaches the nozzle 12; at the same time the pressurized steam coming from the duct 6 fills the nozzle 13 and comes out. The milk which comes out of the nozzle 12 is carried by the steam expanding around the nozzle 12. In this step the mixing of the appropriately proportioned steam and atomized milk takes place. If necessary, in order to modify, as one wishes, the consistency of the froth to be made, a small percentage of air can be added by means of the auxiliary duct 8 and by the relative pin device 9. The quantity of air added can be controlled by screwing, or unscrewing, the pin 9 with respect to the washer 11, reducing the section of the pin 9 lengthwise, the major screwing of the pin, therefore the major penetration of the same in the auxiliary duct 8, allows the passage of a minor quantity of air and vice versa.

The milk-steam and possible added air mixture then passes from the fitting 15, through the duct 35, in the chamber 17, in which, flowing tangentially, it takes on a rotatary movement. The thermomechanical action, together with the small percentage of air, causes the foaming of the milk making it frothy. The froth which is made, goes out, through the duct 19, from the chamber 17 and can be collected by the user.

The cleaning of the device is advantageously carried out by pushing and releasing the pin 9 in the duct 8 and pushing and releasing the pin 4 in the duct 31. A possible exceptional maintenance operation can be facilitated by unscrewing the inner body 2 and removing the cover 18 of the chamber 17.

I claim:

1. Device for obtaining frothy milk, comprising an upstream mixing assembly and a downstream frothing assembly communicating with said upstream mixing assembly, said upstream mixing assembly comprising a milk feeding duct terminating in a first nozzle, and a steam feeding duct terminating in a second nozzle, said first and second nozzles being coaxial and concentrically disposed such that said second nozzle surrounds said first nozzle to define an annular space therebetween, and said first nozzle projects beyond said second nozzle, said downstream frothing assembly comprising an expansion chamber, said device further comprising a passageway interconnecting said upstream mixing assembly and said downstream frothing assembly, and opening tangentially into said expansion chamber.

2. The device according to claim 1, wherein said first nozzle has a diameter of about 1.1–1.2 mm, and said annular space has a radial extent of about 0.2 mm, said first nozzle projecting beyond said second nozzle by a distance of about 0.2 mm.

3. The device according to claim 1, wherein said upstream mixing assembly further comprises an auxiliary lateral air duct having an outlet disposed downstream of said annular space surrounding said first nozzle.

4. The device according to claim 3, wherein said auxiliary lateral air duct comprises means for controlling air flow therethrough.

5. The device according to claim 4, wherein said means for adjusting air flow comprises a first pin engaged in said auxiliary air duct, said pin tapering along its length such that the extent of insertion of the pin in said duct regulates a quantity of air sucked into said device.

6. The device according to claim 1, further comprising a second pin adapted to engage said milk feeding duct, said device further comprising a milk inlet perpendicular to and communicating with said milk feeding duct.

7. The device according to claim 1, wherein said expansion chamber is a cylindrical chamber having a bottom portion comprising a baffle capable of diverting fluid flow within said chamber.

8. The device according to claim 7, wherein said expansion chamber further comprises a cover having a concave inner surface.

* * * * *